(12) United States Patent
Rajagopal

(10) Patent No.: US 8,139,682 B2
(45) Date of Patent: Mar. 20, 2012

(54) CHANNEL ESTIMATION OF ORTHOGONAL FREQUENCY DIVISION MULTIPLEXED SYSTEMS

(75) Inventor: Ravikiran Rajagopal, Yardley, PA (US)

(73) Assignee: Advanced Micro Devices, Sunnyvale, CA (US)

( * ) Notice: Subject to any disclaimer, the term of this patent is extended or adjusted under 35 U.S.C. 154(b) by 1003 days.

(21) Appl. No.: 11/961,399

(22) Filed: Dec. 20, 2007

(65) Prior Publication Data

US 2009/0161773 A1 Jun. 25, 2009

(51) Int. Cl.
*H03K 9/00* (2006.01)
(52) U.S. Cl. ............... 375/316; 375/260; 348/388.1; 380/31; 380/34; 455/17; 455/59; 455/61
(58) Field of Classification Search ............ None
See application file for complete search history.

(56) References Cited

U.S. PATENT DOCUMENTS

2003/0072395 A1* 4/2003 Jia et al. .................. 375/341
2007/0092016 A1* 4/2007 Cheng et al. ............. 375/260
2007/0206687 A1* 9/2007 Ananth et al. ............ 375/260

FOREIGN PATENT DOCUMENTS

WO 03/034646 4/2003

OTHER PUBLICATIONS

European Telecommunications Standards Institute, "Digital Video Broadcasting (DVB); Framing Structure, Channel Coding and Modulation for Digital Terrestrial Television", ETSI EN 300 744 V1.5.1, (Nov. 2004).
Unser et al. "B-Spline Signal Processing: Part I—Theory", IEEE Transactions on Signal Processing, vol. 41, No. 2, pp. 821-833, (Feb. 1993).
Unser et al. "B-Spline Signal Processing: Part II—Efficiency Design and Applications", IEEE Transactions on Signal Processing, vol. 41, No. 2, pp. 834-848, (Feb. 1993).

* cited by examiner

*Primary Examiner* — David C. Payne
*Assistant Examiner* — Adolf Dsouza
(74) *Attorney, Agent, or Firm* — Volpe and Koenig P.C.

(57) ABSTRACT

Methods and apparatus, including computer program products, are provided for channel estimation. In one aspect, there is provided a receiver including a demodulator for decoding a signal including at least one of a transmission parameter signaling (TPS) carrier and a data carrier. The receiver further includes a channel estimator, coupled to the demodulator, for determining a channel estimate for the TPS carrier. Moreover, the receiver includes an interpolator, coupled to the channel estimator, for determining, based on the determined channel estimate for the TPS carrier, another channel estimate for the data carrier. Related systems, methods, and articles of manufacture are also disclosed.

20 Claims, 4 Drawing Sheets

CHANNEL ESTIMATION OF ORTHOGONAL FREQUENCY DIVISION MULTIPLEXED SYSTEMS

FIELD

The present disclosure generally relates to channel estimation.

BACKGROUND

Digital Video Broadcasting (DVB) is a standards-based technology. For example, Digital Video Broadcasting (DVB): Framing Structure, channel coding and modulation for digital terrestrial television, ETSI EN 300 744, version 1.5.1 ("DVB standard") is a European standard for DVB, which implements a form of orthogonal frequency division multiplexing (OFDM) referred to as coded OFDM.

OFDM is a digital modulation technique that uses multiple carriers, each having closely-spaced orthogonal sub-carriers. The sub-carriers are each modulated using a conventional modulation scheme, such as QAM (quadrature amplitude modulation). DVB implements OFDM to provide enhanced performance in the presence of deteriorating channel conditions.

SUMMARY

The subject matter disclosed herein provides methods and apparatus, including computer program products, for channel estimation in an orthogonal frequency division multiplexed system (OFDM), such as the OFDM-based system used in connection with DVB.

Methods and apparatus, including computer program products, are provided for channel estimation. In one aspect, there is provided a receiver including a demodulator for decoding a signal including at least one of a transmission parameter signaling (TPS) carrier and a data carrier. The receiver further includes a channel estimator, coupled to the demodulator, for determining a channel estimate for the TPS carrier. Moreover, the receiver includes an interpolator, coupled to the channel estimator, for determining, based on the determined channel estimate for the TPS carrier, another channel estimate for the data carrier.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
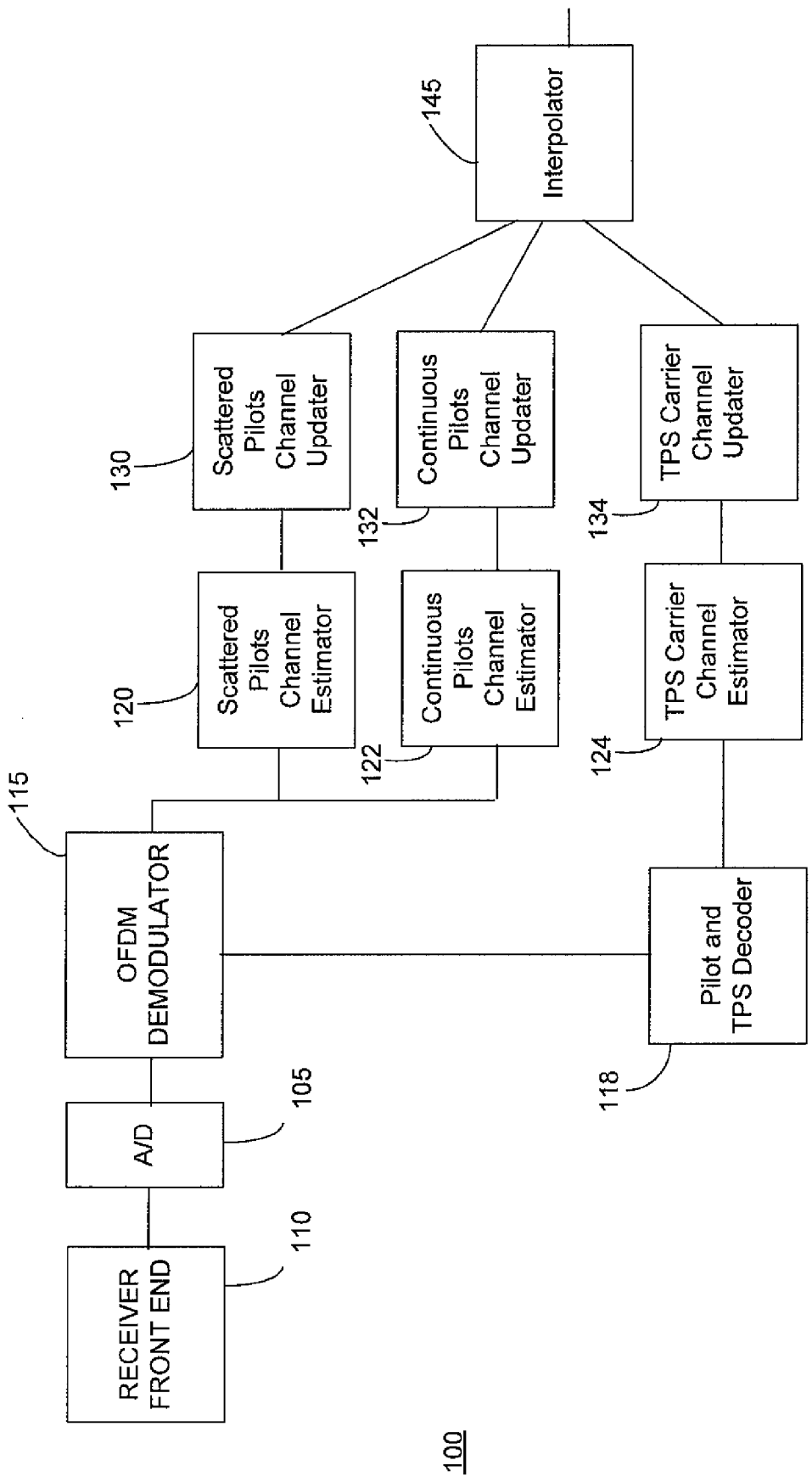
FIG. 1 depicts a block diagram of a system 100 for channel estimation.

Like labels are used to refer to same or similar items in the drawings.

DETAILED DESCRIPTION

Systems implementing the DVB standard for digital television do not use dedicated preambles as part of the OFDM transmission scheme, but instead these systems use a scheme of continuous and scattered pilot carriers. The continuous and scattered pilot carriers are located on every third carrier in an OFDM carrier structure. A channel estimate may be regenerated for every symbol using the pilots and past estimates of the carrier channel. However, when there is a poorly behaved, deteriorating channel, a significant fraction of the pilots may make any estimate of the channel unreliable (or unavailable). A channel estimate provides an indication of the conditions (e.g., performance) of the channel. The channel estimate may also provide an indication of the deterioration of the channel in the presence of fading, multi-path, noise, interference, and the like. The channel estimate may be represented as a channel response (e.g., complex information including magnitude and phase), a bit error rate, a carrier-to-interference ratio, a carrier-to-noise ratio, and any other indication of the condition of a channel. The subject matter described herein relates to obtaining enhanced channel estimates even in the presence of poorly behaved channels.

A channel estimate may be determined by estimating a static channel response across all carriers in a DVB system (e.g., without decision feedback equalization) by determining a channel estimate at each pilot (e.g., the scattered pilots and the continuous pilots), and then interpolating the channel estimate across all of the other channels (e.g., the data carriers). When poorly behaved channels are present, one or more pilots may be lost due to deterioration. When that is the case, interpolation results in a very poor (e.g., inaccurate) channel estimate of the other channels, such as the data carriers.

DVB systems include transmission parameter signaling (TPS) carriers. TPS is a signaling scheme used in DVB systems to transport to the receiver parameters related transmission (e.g., the type of channel coding and modulation being used). In some implementations, TPS is transmitted in parallel on 17 TPS carriers in a so-called "2K mode" and on 68 carriers in a so-called "8K mode." The TPS carrier in an OFDM symbol may also be modulated using DBPSK (differential bi-phase shift keying). Each of the TPS carriers of a symbol also carries the same bit in a differentially encoded form. That bit is independent of all other data carriers and pilot carriers. As such, a receiver of the TPS carrier may estimate the TPS (e.g., the bit) without pilot carriers (e.g., when the pilot carriers are corrupted by a poorly behaved channel). Once a channel estimate is performed using the TPS carrier, a receiver may use that channel estimate to interpolate a channel estimate across one or more other channels, such as data carriers. The subject matter described herein relates to estimating the channel at the TPS carriers and then using the channel estimate to interpolate the channel estimate at other channels, such as data carriers. In some implementations, the subject matter described herein uses a non-linear (e.g., non-uniform) interpolation mechanism to determine the channel estimate for the other data carriers.

FIG. 1 depicts a block diagram of a receiver 100 including a receiver front-end 110, an analog-to-digital converter 105, an OFDM demodulator 115, a pilot and TPS decoder 118, a scattered pilot channel estimator 120, a continuous pilot channel estimator 122, a TPS carrier channel estimator 124, a scattered pilot channel updater 130, a continuous pilot channel updater 132, a TPS carrier channel updater 134, and an interpolator 145.

The receiver front end 110 includes one or more RF components, including an antenna, to receive a signal (e.g., a DVB signal including OFDM) and provide the received signal to analog-to-digital converter 105. Analog-to-digital converter 105 converts the analog signal into a digital signal, which is coupled to the input of OFDM demodulator 115. OFDM demodulator 115 processes the received digital signal by performing a Fast Fourier Transform (FFT). The output of the OFDM demodulator 115 is a complex output (e.g., real components and imaginary components) representing a combination of the data (referred to as constellation data) and a channel response (e.g., an estimate of the channel). For example, constellation data represents the data carriers, TPS carriers, and pilots; channel response (i.e., the channel estimate) represents a response of the channel (or carrier). To demodulate the constellation data, the channel response is determined (i.e., estimated).

Pilot and TPS decoder 118 receives the output of the OFDM demodulator 115, decodes the TPS carrier, and provides as an output the decoded TPS signal to TPS carrier channel estimator 124.

The output of OFDM demodulator 115 is also provided to scatter pilot channel estimator 120 and continuous pilot channel estimator 122. Channel estimators 120 and 122 estimate the channel response associated with the scattered pilots and continuous pilots associated with an OFDM signal, such as a COFDM signal used in DVB. Although there are differences between OFDM and COFDM, the terms are used interchangeably in the instant detailed description.

Figure 2:
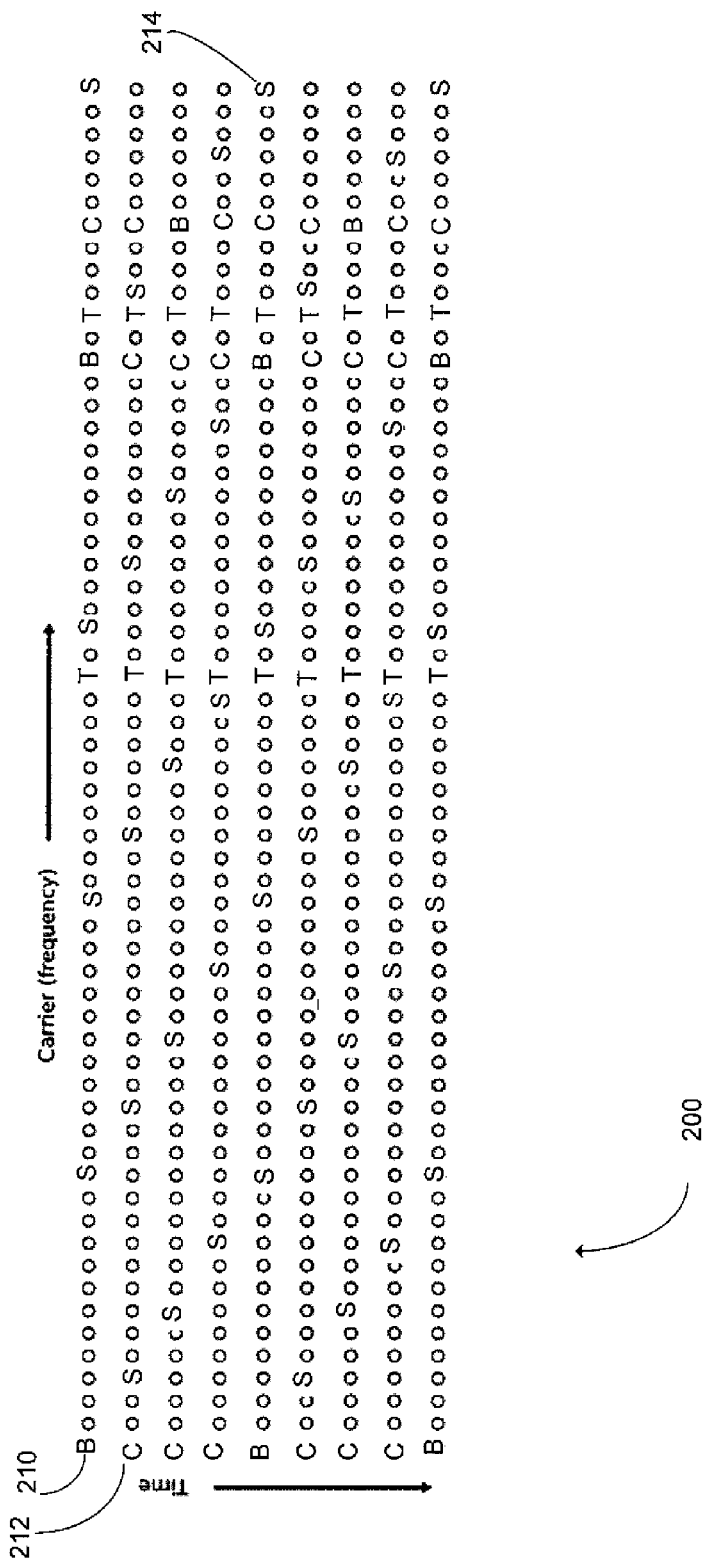
FIG. 2 depicts OFDM carriers.

FIG. 2 depicts an OFDM signal 200 consistent with the DVB standard, although OFDM signal 200 may be formatted and structured in other ways as well. Each row represents a symbol (e.g., an OFDM symbol or a COFDM symbol) transmitted over a plurality of carrier frequencies, as depicted by the horizontal arrow. At row 210, the first point labeled "B" represents a continuous and scattered pilot tone transmitted in an OFDM symbol at a carrier frequency. Because the continuous and scattered pilots have known values, channel estimation for the carrier frequency may be performed using channel estimators 120-122. The second point labeled "O" represents data transmitted in an OFDM symbol at a carrier frequency. The twelfth point labeled "S" represents a scattered pilot transmitted in an OFDM symbol at a carrier frequency. The scattered carriers are repeated every 12 carrier slots. The point labeled "T" represents a TPS carrier including a TPS transmitted in an OFDM symbol at a carrier frequency. Channel estimation for the TPS carrier is performed using TPS channel estimator 124.

The second row 212 represents another symbol. The first point labeled "C" represents a continuous pilot transmitted in an OFDM symbol at a carrier frequency. The scattered pilot labeled S is shifted three carriers, so that after 4 symbol periods (see row 214), the OFDM carrier structure repeats.

After the channel estimators 120-124 estimate the channels for the scattered pilots, continuous pilots, and TPS carrier, scattered pilot channel estimate updater 130, continuous pilot channel estimate updater 132, TPS carrier channel estimate updater 134 update any previously determined channel estimates. For example, after the channel estimator 120 estimates the channel response for a channel including a scattered pilot, scattered pilot channel estimate updater 130 provides an updated (e.g., using a previously determined and stored channel estimate) estimate of the channel response for the carrier channel for the scattered pilot. After the channel estimator 122 estimates the channel response for a channel including a continuous pilot, continuous pilot channel estimate updater 132 provides an updated (e.g., using a previously determined and stored channel estimate) estimate of the channel response for the carrier channel for the continuous pilot. After the channel estimator 124 estimates the channel response for a channel including a TPS carrier, TPS carrier channel estimate updater 134 provides an updated (e.g., using a previously determined and stored channel estimate) estimate an estimate of the channel response for the TPS carrier channel.

Figure 3:
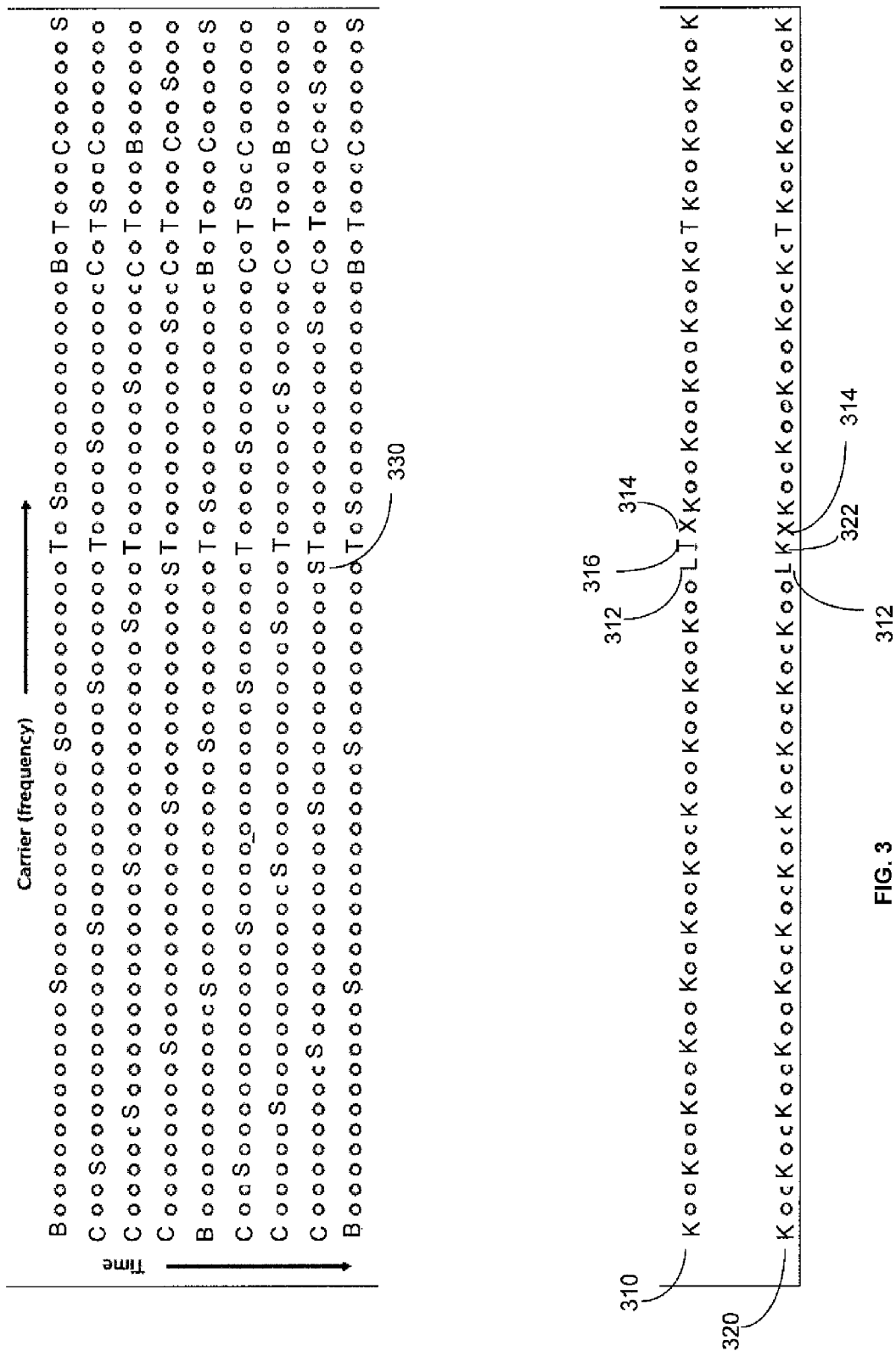
FIG. 3 depicts channel estimation applied to the OFDM carriers of FIG. 2.

FIG. 3 depicts the symbols of FIG. 3 with the addition of two rows 310 and 320. The symbols "K" in row 320 represent carrier channels having a channel estimate determined by 120-134. At row 310, a given carrier labeled "L" 312 is a corrupted channel (e.g., having a poor channel response). Carrier channel L 312 represents a channel estimate based on a scattered pilot (S 330). The channel estimate is used to interpolate a channel estimate for data carrier channel 314 (labeled X). However, carrier 312 was corrupted (e.g., lost). As such, using carrier channel L 312 to interpolate a channel estimate for data carrier 314 would likely yield a very poor channel estimate for data carrier 314. Instead of interpolating based on carrier 312 (representing a scattered pilot S 330), system 100 interpolates, using interpolator 145, a channel estimate based on TPS channel 316 (labeled T).

Row 320 depicts row 310 after TPS carrier channel updater 134 provides a channel estimate for the TPS carrier 316 of row 310 (now labeled "K" 322 at row 320). Interpolator 145 may be then be used to interpolate the channel response of data carrier channel X 314. Because the channel estimate of the TPS channel 322 has been determined, interpolator 145 may be used to interpolate the channel estimate of channel X 314 even when the scattered pilot channel estimate is lost at 312. An enhanced channel estimate for channel X 312 may increase the likelihood that the constellation data for channel X 312 may be decoded.

Figure 4:
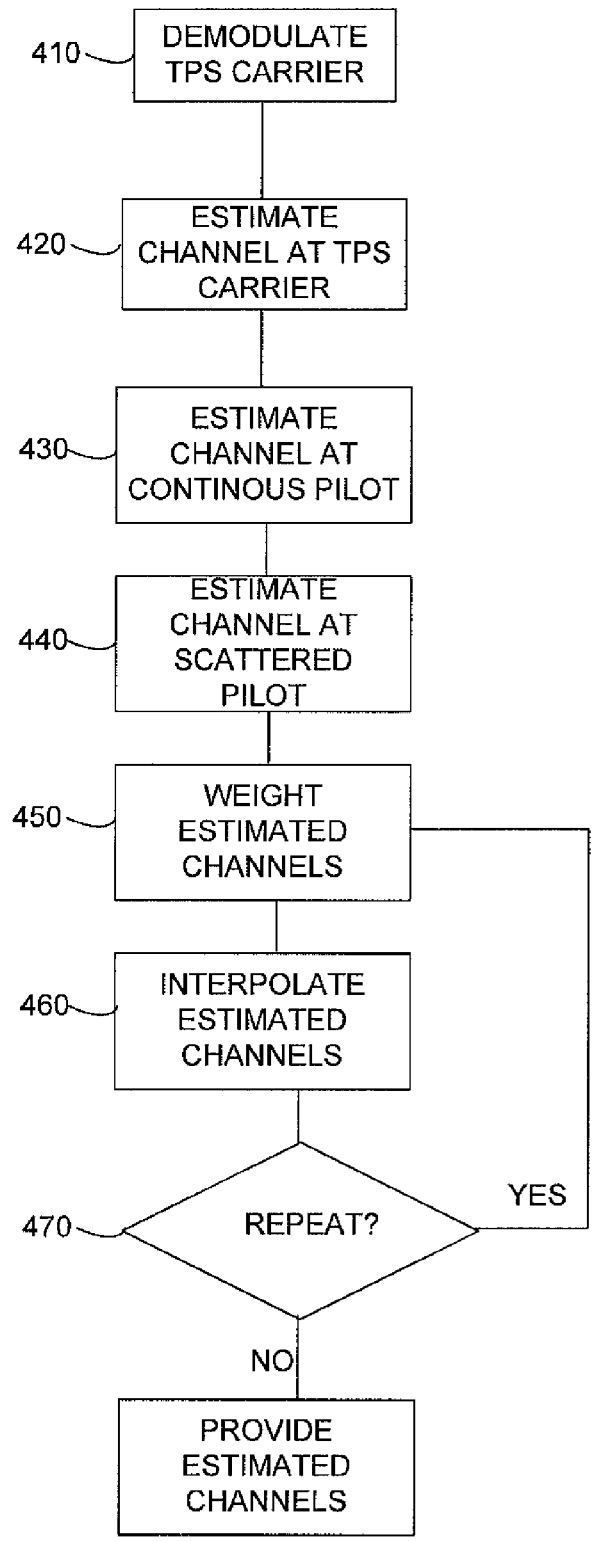
FIG. 4 depicts a process 400 for channel estimation.

FIG. 4 depicts a process 400 for channel estimation based on a TPS.

At 410, pilot and TPS decoder 118 decodes the TPS carrier. In some implementations, pilot and TPS decoder 118 may also decode a TPS bit.

At 420, channel estimator 124 estimates the channel of the TPS decoded and demodulated by pilot and TPS decoder 118. At 430, continuous pilot channel estimator 122 estimates the channel at a continuous pilot channel. At 440, scattered pilot channel estimator 120 estimates the channel at a scattered pilot. The channel estimates determined at 420-440 may be implemented as a complex channel response (e.g., real components and imaginary components representing the channel).

At 450, system 100 applies adaptive weighting to any channel estimates determined at 420-440. In some implementations, the adaptive weights applied to a channel estimate are determined based on the following equation:

$$w(k)=0.5(c(k-1)-c(k+1)) \qquad \text{Equation 1,}$$

where $w(k)$ is the weight applied to a channel estimate, $c(k-1)$ is the distance (expressed, for example as a number of carriers) between the previous pilot and/or TPS; and $c(k+1)$ is a distance at $k+1$. Referring to FIG. 3, the channel estimate of a channel may be estimated (see, e.g., K), so that the channel estimate of carrier 322 is weighted using $w(k)$. Alternatively, the $w(k)$ of Equation 1 may be implemented as follows:

$$w(k)=f(SNR(k-1),SNR(k),c(k-1))+g(SNR(k+1),SNR(k),c(k+1)) \qquad \text{Equation 2,}$$

where g and f are complex functions of the signal to noise ratios and the distances.

At 460, any estimated channels may be interpolated by interpolator 145 to provide a channel estimate for data channels. Referring to FIG. 3, the determined channel estimates (labeled as K at row 320) may be interpolated to determine a channel estimate for a data channel (labeled as O as well as X 314). In some implementations, interpolator 145 uses the channel estimates for a TPS carrier to determine the channel estimate of a channel. Interpolation generally refers to constructing predicted sample values from one or more actual sample values. There are a variety of ways of performing an interpolation, such as a linear interpolation (e.g., using linear functions), a spline interpolation, a rational interpolation (e.g., using interpolation by rational functions), a trigonometric interpolation (e.g., using interpolation by trigonometric polynomials, such as a discrete Fourier transform or a wavelet), a Whittaker-Shannon interpolation, and a multivariate interpolation (e.g., bi-linear, bi-cubic, and tri-linear) among others. Moreover, in some implementations, a non-linear (also referred to as non-uniform) interpolator may be used to interpolate at interpolator 145. Furthermore, in some implementations, enhanced results may be obtained when interpolator 145 uses a non-linear interpolation approach, when compared to a linear interpolation approach.

Interpolator 145 may use a non-linear interpolation referred to as a spline interpolation. Spline interpolation uses low-degree polynomials as the interpolant rather than the linear function used with linear interpolation. The interpolator 145 may be implemented using a simple filter-based spline interpolation technique with very low filter orders that can be realized in hardware, although software and firmware implementations may be used as well. Simple algorithms for filter-based spline interpolations are described in "B-Spline Signal Processing: Part I—Theory," M. Unser et al., IEEE Trans. Signal Processing, vol. 41, pp. 821-833, February 1993, and "B-Spline Signal Processing; Part 2—Design and Applications," M. Unser et al., IEEE Trans. Signal Processing, vol. 41, pp. 834-848, February 1993, the contents of both of which are hereby incorporate herein by reference.

At 470, carriers other than a TPS carrier (e.g., "T" at FIGS. 2 and 3), scattered pilot (e.g., "S" at FIGS. 2 and 3), continuous pilot (e.g., "C" at FIGS. 2 and 3), and continuous and scattered pilot (e.g., "B" at FIGS. 2 and 3) are nulled out (e.g., made equal to zero or another value), and then 450 and 460 are repeated to refine the estimate.

At 480, interpolator 145 provides one or more channel estimates, so that the data constellation (e.g. data in the carrier) may be further decoded.

Moreover, although the above describes channel estimation in a DVB system, the implementations described above may be used in any environment including, for example, a radio, a digital satellite radio, a mobile wireless device (e.g., a mobile phone), wireless-enabled personal digital assistants (e.g., Blackberries), home media players (e.g., Slingbox), GPS receivers, digital ship-to-shore communication links, and the like. In addition, to simplify the explanation of the features of the subject matter described herein, FIG. 1 has been simplified to include only some of the aspects that may be included in system 100. Furthermore, the terms carriers, channels, and frequency channels are used interchangeably in the above detailed description.

In addition to hardware implementations of devices that provide the channel estimation, devices that provide channel estimations may be implemented as software disposed, for example, in a computer usable medium (e.g., computer readable medium or a computer program product) configured to store the software (e.g., a computer readable program code). The program code may provide one or more of the following: the functions of the apparatus and methods disclosed herein (such as systems and methods for providing channel estimation); the fabrication of the systems and methods disclosed herein (such as the fabrication of devices to provide channel estimation); or a combination of the functions and fabrication of the systems and methods disclosed herein. For example, this can be accomplished through the use of general programming languages (e.g., C or C++), hardware description languages (HDL) including Verilog, Verilog-A, HDL, VHDL, Altera HDL (AHDL) and so on, or other available programming and/or schematic capture tools (such as circuit capture tools) or stored in graphic data system (GDS or GDS II) format. The program code can be disposed in any computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a media processing core) that is embodied in program code and may be transformed to hardware as part of the production of integrated circuits.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment.

The foregoing description is intended to illustrate but not to limit the scope of the invention, which is defined by the scope of the appended claims. Other embodiments are within the scope of the following claims.

What is claimed is:

1. A method comprising:
    receiving a signal including one or more carriers, at least one of the carriers including a transmission parameter signaling (TPS) carrier, a pilot carrier, and a data carrier;
    determining a TPS channel estimate for the TPS carrier;
    if a pilot channel estimate can be obtained based on the pilot carrier, determining a data channel estimate for the data carrier, based on the determined TPS channel estimate and the pilot channel estimate; or
    if a pilot channel estimate cannot be obtained based on the pilot carrier, determining a data channel estimate for the data carrier based on the determined TPS channel estimate.

2. The method of claim 1, wherein determining the data channel estimate further comprises:
    determining the data channel estimate for the data carrier by interpolation.

3. The method of claim 1, wherein receiving further comprises:
    receiving the signal as at least one of a coded orthogonal frequency division multiplexed signal and a orthogonal frequency division multiplexed signal.

4. The method of claim 1, wherein receiving further comprises: receiving the signal as a coded orthogonal frequency division multiplexed signal to provide a digital video broadcast.

5. The method of claim 1 wherein receiving further comprises:
    receiving the signal as a coded orthogonal frequency division multiplexed signal to provide a digital video broadcast.

6. A receiver comprising:
- a demodulator configured to decode a signal including one or more carriers, at least one of the carriers including a transmission parameter signaling (TPS) carrier, a pilot carrier and a data carrier;
- a channel estimator, coupled to the demodulator, configured to determine a TPS channel estimate for the TPS carrier; and
- an interpolator, coupled to the channel estimator, configured to determine a data channel estimate for the data carrier based on:
  - the determined TPS channel estimate and a pilot channel estimate, if a pilot channel estimate can be obtained based on the pilot carrier, or
  - the determined TPS channel estimate if a pilot channel estimate cannot be obtained based on the pilot carrier.

7. The receiver of claim 6, wherein the demodulator further comprises:
- an orthogonal frequency division multiplexing (OFDM) demodulator for decoding an OFDM signal; and
- a decoder for the TPS carrier.

8. The receiver of claim 7, wherein the channel estimator further comprises:
- a scattered pilot channel estimator, coupled to the orthogonal frequency division multiplexing demodulator, configured to determine a scattered pilot channel estimate of a scattered pilot included in the received signal; and
- a TPS channel estimator, coupled to the orthogonal frequency division multiplexing demodulator, configured to determine the TPS channel estimate.

9. The receiver of claim 8, wherein the channel estimator further comprises:
- a continuous pilot channel estimator, coupled to the orthogonal frequency division multiplexing demodulator, configured to determine a continuous pilot channel estimate of a continuous pilot included in the received signal.

10. The receiver of claim 7, wherein the channel estimator further comprises:
- a continuous pilot channel estimator, coupled to the orthogonal frequency division multiplexing demodulator, configured to determine a channel estimate of a continuous pilot included in the received signal; and
- a TPS channel estimator, coupled to the orthogonal frequency division multiplexing demodulator, configured to determine the TPS channel estimate of the TPS signal included in the TPS carrier.

11. The receiver of claim 6, wherein the interpolator further comprises:
- an interpolator, coupled to the channel estimator, for determining another channel estimate for the data carrier based on a non-linear interpolation.

12. The receiver of claim 6, wherein the demodulator further comprises:
- a decoder for decoding the signal received as at least one of a coded orthogonal frequency division multiplexed signal and a orthogonal frequency division multiplexed signal.

13. The receiver of claim 6, wherein the demodulator further comprises:
- a decoder for decoding the signal as a coded orthogonal frequency division multiplexed signal of a digital video broadcast.

14. A computer-readable medium containing instructions to configure a processor to perform a method, the method comprising:
- receiving a signal including one or more carriers, at least one of the carriers including a transmission parameter signaling (TPS) carrier, a pilot carrier, and a data carrier;
- determining a TPS channel estimate for the TPS carrier;
- if a pilot channel estimate can be obtained based on the pilot carrier, determining a data channel estimate for the data carrier, based on the determined TPS channel estimate and the pilot channel estimate;
- if a pilot channel estimate cannot be obtained based on the pilot carrier, determining a data channel estimate for the data carrier based on the determined TPS channel estimate.

15. The computer-readable medium of claim 14, wherein determined the second channel estimate further comprises:
- determining the data channel estimate for the data carrier by interpolation.

16. The computer-readable medium of claim 14, wherein receiving further comprises:
- receiving the signal as at least one of a coded orthogonal frequency division multiplexed signal and a orthogonal frequency division multiplexed signal.

17. The computer-readable medium of claim 14, wherein receiving further comprises:
- receiving the signal as a coded orthogonal frequency division multiplexed signal of a digital video broadcast.

18. A method comprising:
- receiving a signal including one or more carriers, at least one of the carriers including a transmission parameter signaling (TPS) carrier, a continuous pilot carrier, a scattered pilot carrier, and a data carrier;
- determining a TPS channel estimate for the TPS carrier;
- attempting to determine pilot channel estimates for the continuous pilot carrier and the scattered pilot carrier;
- determining a data channel estimate for the data carrier, based on:
  - the determined TPS channel estimate and any determined pilot channel estimates resulting from the attempting;
  - based on the determined TPS channel estimate if no pilot channel estimates result from the attempting.

19. The method of claim 18 wherein determining the data channel estimate further comprises:
- determining the data channel estimate for the data carrier by interpolation.

20. The method of claim 18 wherein receiving further comprises:
- receiving the signal as at least one of a coded orthogonal frequency division multiplexed signal and a orthogonal frequency division multiplexed signal.

* * * * *